United States Patent
Cantrell

(10) Patent No.: US 6,418,923 B1
(45) Date of Patent: Jul. 16, 2002

(54) HOOD MOUNTING DEVICE FOR BARBECUE GRILLS

(75) Inventor: Chris Cantrell, Midland, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 09/927,209

(22) Filed: Aug. 10, 2001

(51) Int. Cl.⁷ .............. A47J 37/00; F24B 3/00
(52) U.S. Cl. .......... 126/25 R; 126/41 R; 220/810; 220/252
(58) Field of Search .............. 126/25 R, 41 R, 126/38, 25 A, 37 B, 190, 194, 193; D7/402–404, 332–337; 220/252, 810, 825, 826, 820, 845, 846

(56) References Cited

U.S. PATENT DOCUMENTS

| | | | | |
|---|---|---|---|---|
| 3,789,822 A | * | 2/1974 | Schantz | 126/41 R |
| 3,859,978 A | * | 1/1975 | Smith | 126/25 A |
| 4,729,364 A | * | 3/1988 | Dailey | 126/41 R |
| 4,989,579 A | * | 2/1991 | Murphy et al. | 126/41 R |
| 5,070,776 A | * | 12/1991 | Schlosser et al. | 126/41 R |
| 5,960,784 A | * | 10/1999 | Ryan | 126/41 R |
| 6,024,082 A | * | 2/2000 | Straubel et al. | 126/25 R |

* cited by examiner

Primary Examiner—James C. Yeung
(74) Attorney, Agent, or Firm—James W. Kayden; Thomas, Kayden, Horstemeyer & Risley, LLP

(57) ABSTRACT

A hood mounting device including at least one cam having a first surface and an aperture located on the bottom casting. At least one second surface is located on the grill hood and is configured such that the first and said second surfaces contact each other when the hood is placed in the closed position on the lower casting. The hood mounting device is configured such that a corresponding aperture formed in the hood is axially aligned with the aperture in the lower casting when the hood is in the closed position. Longitudinal securing means are passed through the axially aligned aperture and corresponding aperture, thereby rotatably securing the hood to the bottom casting.

10 Claims, 2 Drawing Sheets

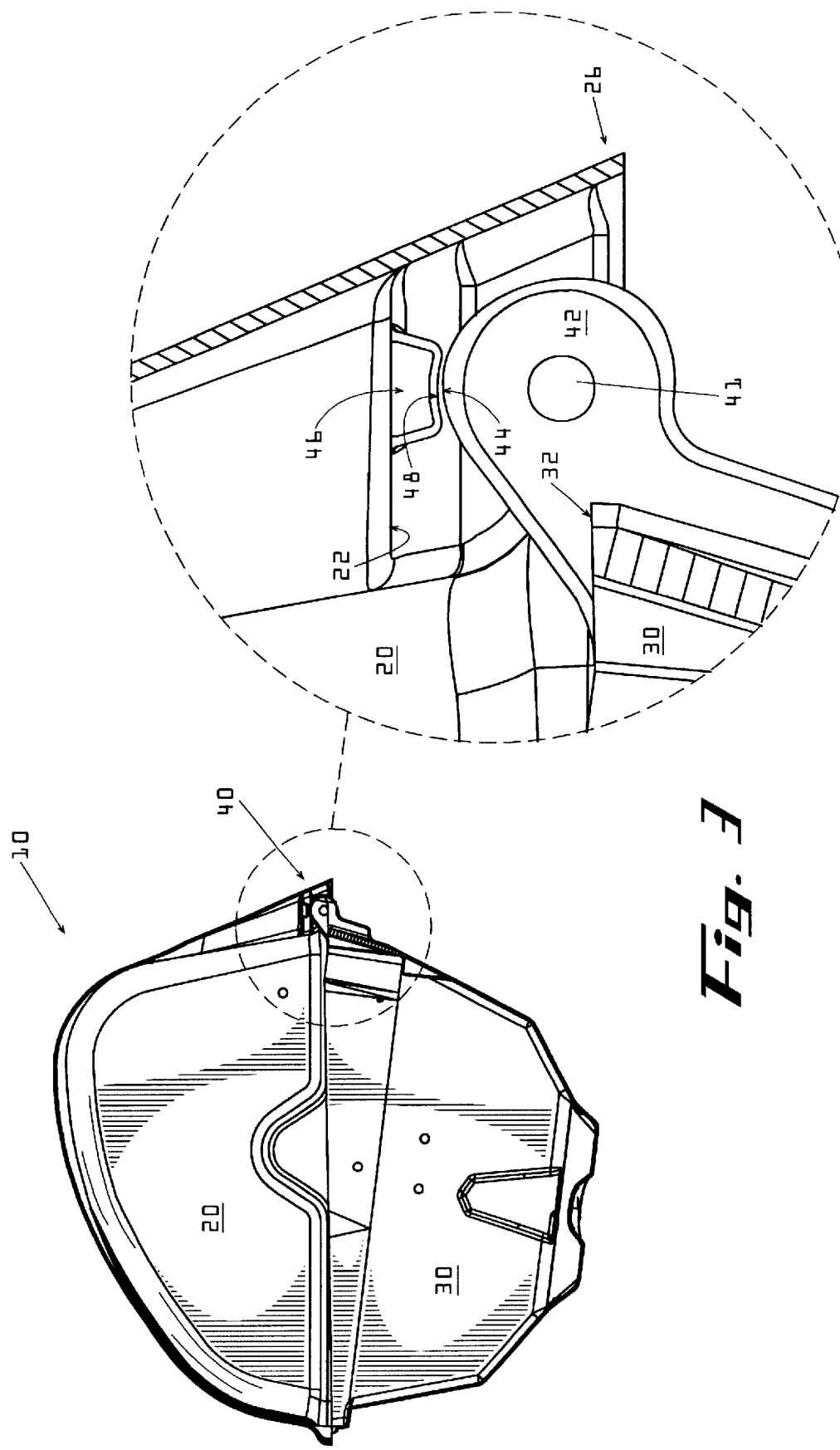

HOOD MOUNTING DEVICE FOR BARBECUE GRILLS

FIELD OF THE INVENTION

The present invention generally relates to the field of barbecue grills and, more particularly, to a device facilitating mounting grill hoods to bottom castings of barbecue grills.

BACKGROUND OF THE INVENTION

Commonly, barbecue grills are not assembled when they are purchased. This makes commercial sense in that each barbecue grill requires less space during shipping and storing, meaning more units can be transported in each shipment, thereby saving money for both the manufacturer and the retailer of the barbecue grill. In addition, this provides for easier transportation of the barbecue grill from the store by the purchaser. The purchaser has to either partially or fully assemble the barbecue grill prior to use. This usually means the hood, or upper casting, of the grill must be attached to the bottom casting of the grill.

Frequently, grills are constructed such that the grill hood is attached to the bottom casting by passing securing means through matching apertures in the hood and the bottom casting. This proves to be difficult because typical grills are constructed such that to achieve this task, the hood must be lifted into a position where the apertures align, and supported until the securing means are passed therethrough. Numerous factors compound the difficulty of this task. First, because grills are subjected to extreme temperatures during use and extreme environmental conditions, they are frequently constructed of durable, and often heavy, materials. In addition, with the recent increase in recreational outdoor cooking, the sizes of barbecue grills available have increased. Subsequently, the sizes of many grill hoods have increased, making them even more cumbersome to lift and hold in the required position. Finally, the primary factor contributing to the difficulty of this task is that a single individual may be required to attach the hood, and therefore, will have to lift and hold the hood in place while attempting to pass the securing means through the aligned apertures.

Therefore, there is a need for providing grills having improved grill carts that address these and other shortcomings of the prior art.

SUMMARY OF THE INVENTION

Briefly described, the hood mounting device provides an apparatus that facilitates the attachment of a grill hood to the bottom casting of a grill. An embodiment of the hood mounting device includes at least one cam having a first surface and an aperture located on the bottom casting. At least one second surface is located on the grill hood and is configured such that the first and said second surfaces contact each other when the hood is placed in the closed position on the lower casting. The hood mounting device is configured such that a corresponding aperture formed in the hood is axially aligned with the aperture in the lower casting when the hood is in the closed position. Longitudinal securing means are passed through the axially aligned aperture and corresponding aperture, thereby rotatably securing the hood to the bottom casting.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed upon clearly illustrating the principles of the present invention.

FIG. 3 is a side elevation view of the grill hood and bottom casting shown in FIG. 1 in the closed position, showing detail of an embodiment of the hood mounting device.

Figure 1:
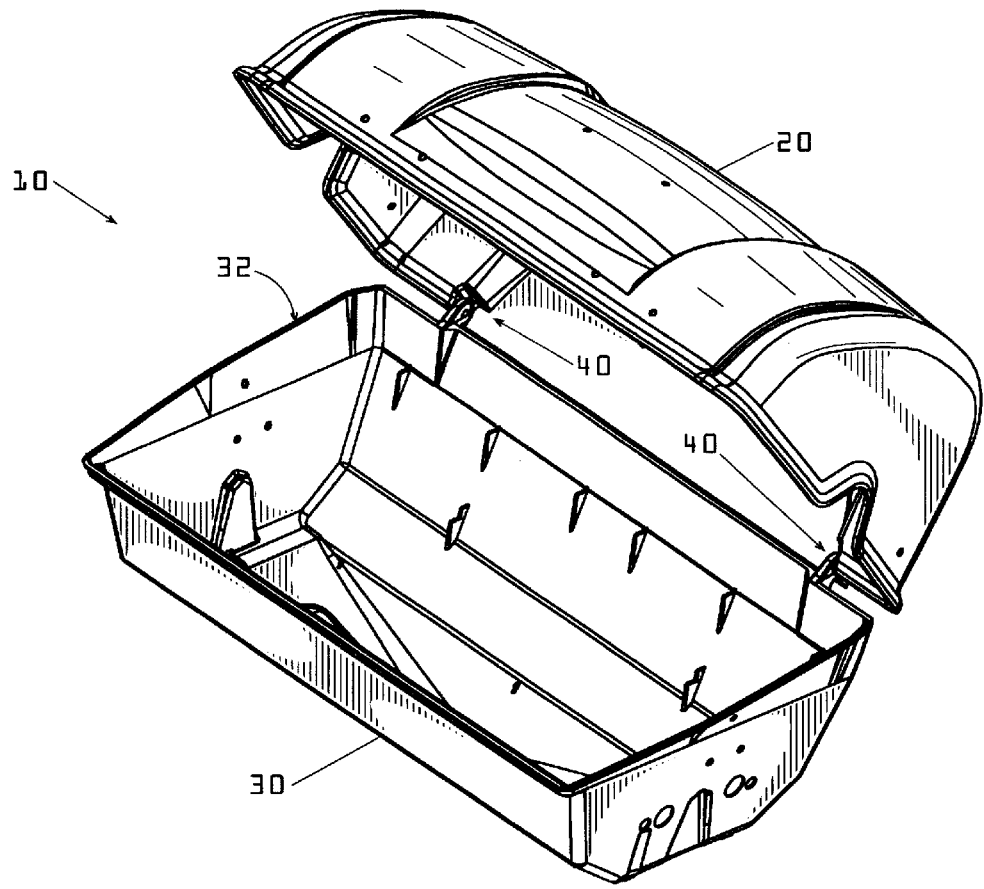
FIG. 1 is a perspective view of a grill hood and bottom casting including an embodiment of the hood mounting device of the present invention.

Reference will now be made in detail to the description of the hood mounting device as illustrated in the drawings. While the hood mounting device will be described in connection with these drawings, there is no intent to limit it to the embodiment or embodiments disclosed therein. On the contrary, the intent is to cover all alternatives, modifications and equivalents included within the spirit and scope of the hood mounting device as defined by the appended claims.

DETAILED DESCRIPTION OF THE PREFERRED EMBODIMENT

Figure 2:
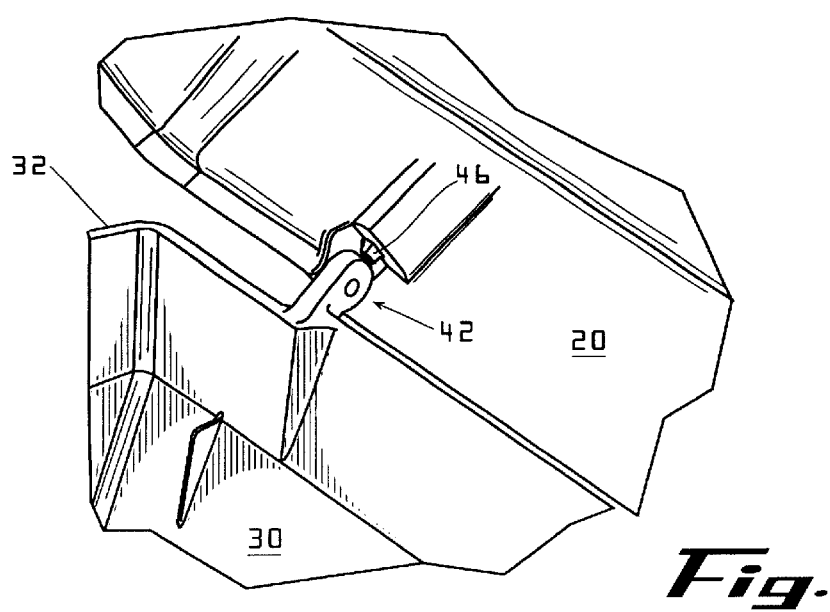
FIG. 2 is a partial, perspective view of the grill hood and bottom casting shown in FIG. 1, showing detail of an embodiment of the hood mounting device.

Referring now more specifically to the drawings, and to FIGS. 1 and 2 in particular, numeral 10 designates generally a barbecue grill 10. The barbecue grill 10 includes a hood 20 that is rotatably attached to the lover casting 30 by way of an embodiment of the hood mounting device 40 of the present invention. As shown, the embodiment of the hood mounting device 40 includes a cam 42 and a cam follower 46. Embodiments are also contemplated wherein a cam follower 46 is integrally formed in the hood during its manufacture.

Referring now to FIG. 3, the barbecue grill 10 is shown in the closed position. Significantly, the closed position is also used during assembly of the hood 20 to the bottom casting 30 when the hood mounting device 40 is used. In the embodiment shown, the hood mounting device 40 includes both a cam 42 and a cam follower 46. The cam 42 is located adjacent the rear portion of the upper periphery 32 of the bottom casting 30. The cam 42 includes a first surface 44 and an aperture 41. The first surface 44 is configured to make contact with a second surface 48 that is located on the hood 20. In the instant case, the second surface 48 is disposed on the cam follower 46.

Ideally, the hood mounting device 40 is located underneath the hood 20 in order to protect it from the elements, as well as to prevent the ingress of rain, etc., into the barbecue grill 10. This is accomplished by extending the rear lip 26 of the hood 20 beyond the cam 42. A substantially horizontal surface 22 is provided above the cam 42 so that the second surface 48 can be properly positioned. In the embodiment shown, the cam follower 46 is disposed on the substantially horizontal surface 22 and extends downwardly therefrom, causing the second surface 48 to contact the first surface 44 when the grill hood 20 is placed on the lower casting 30. This horizontal surface 22 can function as the second surface 48, thereby negating the need for the cam follower 46, provided the horizontal surface 22 is positioned such that it contacts the first surface 44 when the grill hood 20 is in the closed position.

To attach the grill hood 20 to the bottom casting 30, the grill hood 20 is first placed on the lower casting such that the first and second surfaces 44, 48 are in contact with each other. In this position, the hood mounting device 40 ensures that aperture 41 is axially aligned with a corresponding aperture (not shown) formed in the grill hood 20. Now, longitudinal securing means (not shown) are used to rotatably attach the grill hood 20 to the lower casting 30. Because the grill hood 20 is resting on the lower casting 30, it is not necessary to physically support the grill hood 20 while trying to install the securing means through the aligned apertures 41. Numerous securing means are sufficient to attach the grill hood 20, i.e., threaded bolts and nuts, longitudinal members and cotter keys, etc. To ensure smooth opening and closing of the grill hood 20, it is preferred that the first and second surfaces 44, 48 slidably cooperate during use. This can be achieved, where the first surface 44 is concave, as is shown, by making the second surface 48 correspondingly convex. However, this is not necessary, as the second surface 48 could be flat, or even concave, and still fulfill its necessary function.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A hood mounting device for rotatably attaching a hood to a bottom casting of a barbecue grill, comprising:

at least one cam including a first surface and an aperture, said cam being disposed on said bottom casting;

at least one second surface, said second surface being disposed on said hood and configured such that said first and said second surfaces are in contact when said hood is placed in a closed position on said bottom casting, and at least one longitudinal securing means;

wherein a corresponding aperture formed in said hood is axially aligned with said aperture when said hood is placed in said closed position, such that said longitudinal securing means can pass through said aperture and corresponding aperture, thereby rotatably securing said hood to said bottom casting.

2. The hood mounting device of claim 1, wherein said second surface is further disposed on a cam follower.

3. The hood mounting device of claim 2, wherein said first surface is disposed on a top portion of said cam.

4. The hood mounting device of claim 3, wherein said first surface is concave.

5. The hood mounting device of claim 4, wherein said second surface is correspondingly convex to said first surface such that said hood smoothly transitions between an open position and said closed position.

6. The hood mounting device of claim 1, wherein said at least one cam further includes a pair of said cams and said at least one second surface further includes a pair of said second surfaces.

7. The hood mounting device of claim 6, wherein said pair of cams are disposed adjacent a back portion of an upper periphery of said bottom casting.

8. The hood mounting device of claim 7, wherein said hood rotates about a longitudinal axis passing through said aperture and said corresponding apertures.

9. The hood mounting device of claim 6, wherein said pair of cam followers each extend downwardly from a substantially horizontal inner surface of said hood and each of said corresponding apertures is formed in a substantially vertical wall portion of said hood, each of said substantially vertical wall portions being substantially perpendicular to a corresponding one of said substantially horizontal inner surfaces.

10. The hood mounting device of claim 8, wherein each said corresponding aperture is adjacent an outer surface of said corresponding cam.

\* \* \* \* \*